US012767821B2

(12) United States Patent
Kaku et al.

(10) Patent No.: US 12,767,821 B2
(45) Date of Patent: Oct. 20, 2026

(54) CURABLE COMPOSITION, AND CURED PRODUCT

(71) Applicant: AGC Inc., Tokyo (JP)

(72) Inventors: Daisuke Kaku, Tokyo (JP); Takashi Ito, Tokyo (JP); Yoshitaka Sunayama, Tokyo (JP); Kosuke Yamasaki; Kazuma Konno, Tokyo (JP); Hajime Takeda, Tokyo (JP)

(73) Assignee: AGC Inc., Tokyo (JP)

( * ) Notice: Subject to any disclaimer, the term of this patent is extended or adjusted under 35 U.S.C. 154(b) by 615 days.

(21) Appl. No.: 18/355,736

(22) Filed: Jul. 20, 2023

(65) Prior Publication Data

US 2023/0399464 A1 Dec. 14, 2023

Related U.S. Application Data

(63) Continuation of application No. PCT/JP2022/009529, filed on Mar. 4, 2022.

(30) Foreign Application Priority Data

Mar. 12, 2021 (JP) ................................ 2021-040132
Jun. 29, 2021 (JP) ................................ 2021-107750

(51) Int. Cl.

| | |
|---|---|
| ***C08L 71/02*** | (2006.01) |
| ***C08G 65/26*** | (2006.01) |
| ***C08G 65/331*** | (2006.01) |
| ***C08G 65/336*** | (2006.01) |
| ***C09J 171/02*** | (2006.01) |

(52) U.S. Cl.

CPC .......... *C08L 71/02* (2013.01); *C08G 65/2663* (2013.01); *C08G 65/3312* (2013.01); *C08G 65/336* (2013.01); *C09J 171/02* (2013.01); *C08G 2170/00* (2013.01); *C08G 2190/00* (2013.01); *C08G 2650/04* (2013.01); *C08G 2650/10* (2013.01); *C08G 2650/36* (2013.01); *C08L 2205/025* (2013.01); *C08L 2205/035* (2013.01)

(58) Field of Classification Search

CPC .. C08G 65/336; C08L 71/02; C08L 2205/025
See application file for complete search history.

(56) References Cited

U.S. PATENT DOCUMENTS

| | | | | |
|---|---|---|---|---|
| 2015/0133622 | A1* | 5/2015 | Harumashi | C08L 43/04 568/616 |
| 2022/0056209 | A1 | 2/2022 | Ju et al. | |

FOREIGN PATENT DOCUMENTS

| | | | |
|---|---|---|---|
| CN | 1320057 | C | 6/2007 |
| JP | 5-65405 | A | 3/1993 |
| JP | 7-62205 | A | 3/1995 |
| JP | 9-95609 | A | 4/1997 |
| JP | 2001-11190 | A | 1/2001 |
| JP | 2006-63335 | A | 3/2006 |
| JP | 2009-46539 | A | 3/2009 |
| JP | 2020-176169 | A | 10/2020 |
| WO | WO 2009/022743 | A1 | 2/2009 |
| WO | WO 2020/066551 | A1 | 4/2020 |
| WO | WO 2020/133062 | A1 | 7/2020 |
| WO | WO 2020/138111 | A1 | 7/2020 |
| WO | WO 2020/262273 | A1 | 12/2020 |

OTHER PUBLICATIONS

Machine-generated translation of JP 2009-046539 (no date).*
Machine-generated translation of JP 2020-176169 (no date).*
Machine-generated translation of WO 2020-179644 (no date).*

* cited by examiner

*Primary Examiner* — Marc S Zimmer
(74) *Attorney, Agent, or Firm* — Oblon, McClelland, Maier & Neustadt, L.L.P.

(57) ABSTRACT

The curable composition is a curable composition containing an oxyalkylene polymer A having a reactive silicon group represented by $—SiR_a(X)_{3-a}$, wherein the oxyalkylene polymer A has 6 or more terminal groups per molecule; the terminal group contains at least one selected from the group consisting of a reactive silicon group represented by $—SiR_a(X)_{3-a}$, an active hydrogen-containing group, and an unsaturated group; the oxyalkylene polymer A has 0.3 or more reactive silicon groups per terminal group; and the number average molecular weight of the oxyalkylene polymer A is more than 25,000 and not more than 100,000.

6 Claims, No Drawings

CURABLE COMPOSITION, AND CURED PRODUCT

CROSS REFERENCE TO RELATED APPLICATION

This application is a continuation application based on a PCT Patent Application No. PCT/JP 2022/009529, filed Mar. 4, 2022, whose priority is claimed on Japanese Patent Application No. 2021-040132, filed Mar. 12, 2021 and Japanese Patent Application No. 2021-107750, filed Jun. 29, 2021, the entire contents of which are incorporated herein by reference.

BACKGROUND OF THE INVENTION

Field of the Invention

The present invention relates to a curable composition and a cured product.

The present invention relates to a curable composition containing a polymer having a silicon group having a hydroxyl group or a hydrolyzable group bonded to a silicon atom and capable of crosslinking by forming a siloxane bond (hereinafter referred to as a "reactive silicon group").

Background Art

It has been known that a polymer having at least one reactive silicon group within a molecule crosslinks even at room temperature by the formation of siloxane bonds accompanied by a hydrolysis reaction of the reactive silicon group due to moisture or the like, and a rubber-like cured product is obtained.

Examples of these polymers having a reactive silicon group include those in which the main chain skeleton is composed of oxyalkylene polymers, saturated hydrocarbon polymers, polyalkyl acrylate polymers, and polyalkyl methacrylate polymers. These polymers having a reactive silicon group have already been industrially produced and are widely used in applications such as sealing materials, adhesives and coating materials. When a curable composition containing these polymers having a reactive silicon group is used as a sealing material, curability and elongation properties of the cured product are required. Furthermore, durability against repeated expansion and contraction and restorability are required for following the structural expansion and contraction of joints caused by exposure to outdoor environments for a prolonged period of time.

In order to improve the restorability of the cured product, it is conceivable to increase the number of reactive silicon groups in one polymer molecule and increase the crosslinking density. An example in Patent Document 1 discloses an oxyalkylene polymer having a branched main chain structure, four terminal groups in one molecule, and a dialkoxyalkylsilyl group in the terminal group.

Patent Document 2 has an object of shortening the curing time and improving the adhesiveness and shear strength, and an example therein discloses a polymer having a branched main chain structure and having a number average molecular weight of 25,000 in which 85 mol % of hydroxyl groups of an oxyalkylene polymer having 6 hydroxyl groups in one molecule are converted to trimethoxysilyl groups.

CITATION LIST

Patent Documents

[Patent Document 1] Japanese Unexamined Patent Application, First Publication No. 2020-176169

[Patent Document 2] Japanese Unexamined Patent Application, First Publication No. 2009-46539

DISCLOSURE OF INVENTION

Problem to be Solved by the Invention

However, curable compositions containing the polymers in Patent Documents 1 and 2 have room for further improvement in order to improve durability against repeated expansion and contraction when used as a sealing material.

The present invention has been made in view of the above circumstances and provides a curable composition from which a cured product having excellent durability against repeated expansion and contraction can be obtained.

Means to Solve the Problems

The present invention includes the following aspects.

[1] A curable composition containing an oxyalkylene polymer A having a reactive silicon group represented by the following formula (1) and having 6 or more terminal groups, wherein the aforementioned terminal group contains at least one selected from the group consisting of a reactive silicon group represented by the following formula (1), an active hydrogen-containing group, and an unsaturated group, and the aforementioned oxyalkylene polymer A has 0.3 or more of the aforementioned reactive silicon group per terminal group, and the number average molecular weight of the aforementioned oxyalkylene polymer A is more than 25,000 and not more than 100,000.

$$-SiR_a(X)_{3-a} \quad (1)$$

In the formula, R is a monovalent organic group having 1 to 20 carbon atoms and represents an organic group other than a hydrolyzable group, and X represents a hydroxyl group, a halogen atom, or a hydrolyzable group. a is an integer of 0 to 2. When a is 2, R groups may be the same as or different from each other, and when a is 0 or 1, X groups may be the same as or different from each other.

[2] The curable composition according to [1], wherein a ratio of the reactive silicon group in which a is 0 in the aforementioned formula (1) with respect to a total of the aforementioned reactive silicon group, the aforementioned active hydrogen-containing group and the aforementioned unsaturated group present in the aforementioned oxyalkylene polymer A is less than 50 mol %.

[3] The curable composition according to [1] or [2], further including an oxyalkylene polymer B having a reactive silicon group represented by the aforementioned formula (1) and having two or three terminal groups, wherein the aforementioned terminal group contains at least one selected from the group consisting of a reactive silicon group represented by the aforementioned formula (1), an active hydrogen-containing group, and an unsaturated group, the aforementioned oxyalkylene polymer B has 0.3 to 2.0 of the aforementioned reactive silicon groups per terminal group, and a number average molecular weight of the aforementioned oxyalkylene polymer B is from 5,000 to 20,000.

[4] The curable composition according to [3], wherein a ratio of the reactive silicon group in which a is 0 in the aforementioned formula (1) with respect to a total of the aforementioned reactive silicon group, the aforementioned active hydrogen-containing group and the aforementioned unsaturated group present in the aforementioned oxyalkylene polymer A and the aforementioned oxyalkylene polymer B is less than 50 mol %.

[5] The curable composition according to [3] or [4], wherein a ratio of the aforementioned oxyalkylene polymer A with respect to a total mass of the aforementioned oxyalkylene polymer A and the aforementioned oxyalkylene polymer B is from 20 to 95% by mass.

[6] The curable composition according to any one of [1] to [5], further including an oxyalkylene polymer C having a reactive silicon group represented by the aforementioned formula (1) and having two terminal groups, wherein one of the aforementioned terminal groups is an inert monovalent organic group, and the other terminal group contains at least one selected from the group consisting of a reactive silicon group represented by the aforementioned formula (1), an active hydrogen-containing group, and an unsaturated group, the aforementioned oxyalkylene polymer C has 0.2 to 1.0 of the aforementioned reactive silicon groups per terminal group, and the number average molecular weight of the aforementioned oxyalkylene polymer C is from 2,000 to 15,000.

[7] The curable composition according to any one of [1] to [6], further including an oxyalkylene polymer D having no reactive silicon group represented by the aforementioned formula (1) and having a number average molecular weight of 5,000 to 20,000.

[8] The curable composition according to any one of [1] to [7], which is used for a sealant or an adhesive.

[9] A cured product obtained by curing the curable composition according to any one of [1] to [8].

Advantageous Effects of Invention

According to the present invention, it is possible to provide a curable composition from which a cured product having excellent durability against repeated expansion and contraction can be obtained.

DESCRIPTION OF EMBODIMENTS

The meanings and definitions of the terms used in the present specification are as follows.

A numerical range represented by a symbol "-" means a numerical range in which numerical values before and after this symbol "-" are the lower limit and upper limit values.

An "active hydrogen-containing group" refers to at least one group bonded to a carbon atom and selected from the group consisting of a hydroxyl group, a carboxy group, an amino group, a monovalent functional group obtained by removing one hydrogen atom from a primary amine, and a sulfanyl group.

An "active hydrogen" refers to a hydrogen atom based on the aforementioned active hydrogen-containing group and a hydrogen atom based on the hydroxyl group of water.

An "initiator" is a compound having an active hydrogen-containing group.

An "unsaturated group" means a monovalent group containing an unsaturated double bond. Unless otherwise specified, it is at least one group selected from the group consisting of a vinyl group, an allyl group and an isopropenyl group.

An "oxyalkylene polymer" means a polymer having a polyoxyalkylene chain formed from a unit based on a cyclic ether.

In a polyoxyalkylene polymer having a main chain containing a polyoxyalkylene chain and a terminal group bonded to the aforementioned main chain, the term "terminal group" refers to an atomic group containing an oxygen atom closest to the terminal of the molecule of the aforementioned oxyalkylene polymer, among the oxygen atoms in the aforementioned polyoxyalkylene chain.

A "precursor polymer" is a polymer before introduction of a reactive silicon group, and means an oxyalkylene polymer in which a terminal group obtained by polymerizing a cyclic ether on the active hydrogen of the initiator is a hydroxyl group.

A "silylation rate" is a ratio of the number of the aforementioned reactive silicon groups with respect to the total number of reactive silicon groups, active hydrogen-containing groups and unsaturated groups in the oxyalkylene polymer. Silylation rate values can be measured by NMR analysis. In addition, as described later, when introducing the aforementioned reactive silicon group into the terminal group of a derivative of the precursor polymer with a silylating agent, a ratio (mol %) of the number of silyl groups in the added silylating agent with respect to the total number of active hydrogen-containing groups and unsaturated groups in the derivative of the precursor polymer may also be used.

A "silylating agent" means a compound having a functional group that reacts with an active hydrogen-containing group or an unsaturated group and a reactive silicon group.

A "hydroxyl group equivalent molecular weight" is a value obtained by calculating a hydroxyl value of the initiator or precursor polymer based on JIS K 1557 (2007), followed by the calculation using a formula: "56,100/(hydroxyl value)×(the number of active hydrogens in the initiator, or the number of terminal groups in the precursor polymer)".

A number average molecular weight (hereinafter referred to as "Mn") and mass average molecular weight (hereinafter referred to as "Mw") of a polymer are polystyrene equivalent molecular weights obtained by GPC measurement. A molecular weight distribution is a value calculated from Mw and Mn, and is a ratio of Mw with respect to Mn (hereinafter referred to as "Mw/Mn").

The curable composition of the present invention is a curable composition containing an oxyalkylene polymer A having a reactive silicon group represented by the following formula (1) and having 6 or more terminal groups, wherein the aforementioned terminal group contains at least one selected from the group consisting of a reactive silicon group represented by the following formula (1), an active hydrogen-containing group, and an unsaturated group, and the aforementioned oxyalkylene polymer A has 0.3 or more of the aforementioned reactive silicon groups per terminal group, and the number average molecular weight of the aforementioned oxyalkylene polymer A is more than 25,000 and not more than 100,000. Hereinafter, the oxyalkylene polymer A is also referred to as a "polymer A".

$$-SiR_a(X)_{3-a} \quad (1)$$

In the formula, R is a monovalent organic group having 1 to 20 carbon atoms and represents an organic group other than a hydrolyzable group, and X represents a hydroxyl group, a halogen atom, or a hydrolyzable group. a is an integer of 0 to 2. When a is 2, R groups may be the same as or different from each other, and when a is 0 or 1, X groups may be the same as or different from each other.

Polymer A

The polymer A is an oxyalkylene polymer A having a reactive silicon group represented by the aforementioned formula (1), 6 or more terminal groups, and a branched structure, wherein the aforementioned terminal group contains at least one selected from the group consisting of a reactive silicon group represented by the aforementioned formula (1), an active hydrogen-containing group, and an unsaturated group, the aforementioned polymer A has 0.3 or more of the aforementioned reactive silicon groups per terminal group, and the number average molecular weight of the aforementioned polymer A is more than 25,000 and not more than 100,000. Two or more types of polymer A may be contained in the curable composition of the present invention.

The reactive silicon group has a hydroxyl group or a hydrolyzable group bonded to a silicon atom and can be crosslinked by forming a siloxane bond. A reaction to form a siloxane bond is accelerated by a curing catalyst. The reactive silicon group in the polymer A is represented by the following formula (1).

$$—SiR_a(X)_{1-a} \quad (1)$$

In the above formula (1), R represents a monovalent organic group having 1 to 20 carbon atoms. R does not contain a hydrolyzable group.

R is preferably at least one selected from the group consisting of a hydrocarbon group having 1 to 20 carbon atoms and a triorganosiloxy group.

R is preferably at least one selected from the group consisting of an alkyl group, a cycloalkyl group, an aryl group, an α-chloroalkyl group and a triorganosiloxy group, and is more preferably at least one selected from the group consisting of a linear or branched alkyl group having 1 to 4 carbon atoms, a cyclohexyl group, a phenyl group, a benzyl group, an α-chloromethyl group, a trimethylsiloxy group, a triethylsiloxy group and a triphenylsiloxy group. A methyl group or an ethyl group is preferred from the viewpoint of favorable curability of the polymer having a reactive silicon group and favorable stability of the curable composition. An α-chloromethyl group is preferred from the viewpoint that the curing rate of the cured product is high. A methyl group is particularly preferred because it is readily available.

In the above formula (1), X represents a hydroxyl group, a halogen atom, or a hydrolyzable group. X groups may be the same as or different from each other.

Examples of the hydrolyzable group include a hydrogen atom, an alkoxy group, an acyloxy group, a ketoximate group, an amino group, an amide group, an acid amide group, an aminooxy group, a sulfanyl group, and an alkenyloxy group.

An alkoxy group is preferred because it is moderately hydrolyzable and easy to handle. The alkoxy group is preferably a methoxy group, an ethoxy group or an isopropoxy group, and more preferably a methoxy group or an ethoxy group. When the alkoxy group is a methoxy group or an ethoxy group, a siloxane bond is rapidly formed, a crosslinked structure is easily formed in a cured product, and physical property values of the cured product are likely to be favorable.

In the above formula (1), a is an integer of 0 to 2. When a is 2, R groups may be the same as or different from each other. When a is 0 or 1, X groups may be the same as or different from each other. a is preferably 0 because the curability is improved.

Examples of the reactive silicon group represented by the aforementioned formula (1) include a trimethoxysilyl group, a triethoxysilyl group, a triisopropoxysilyl group, a tris(2-propenyloxy)silyl group, a triacetoxysilyl group, a methyldimethoxysilyl group, a methyldiethoxysilyl group, an ethyldimethoxysilyl group, a methyldiisopropoxysilyl group, an (α-chloromethyl)dimethoxysilyl group, and an (α-chloromethyl)diethoxysilyl group. A trimethoxysilyl group, a triethoxysilyl group, a methyldimethoxysilyl group, and a methyldiethoxysilyl group are preferred, and a methyldimethoxysilyl group or a trimethoxysilyl group is more preferred, from the viewpoint of obtaining high activity and favorable curability.

Since the polymer A has a reactive silicon group represented by the above formula (1), the cured product obtained by the curable composition containing the polymer A has favorable restorability and excellent durability against repeated expansion and contraction.

The main chain of the polymer A has an oxyalkylene chain formed by polymerization of one or more cyclic ethers.

Examples of the cyclic ether include alkylene oxides such as ethylene oxide, propylene oxide, 1,2-butylene oxide and 2,3-butylene oxide; and cyclic ethers other than alkylene oxides such as tetrahydrofuran. Ethylene oxide and propylene oxide are preferred, and propylene oxide is more preferred.

The polyoxyalkylene chain may be a copolymer chain having two or more types of oxyalkylene groups. The copolymer chain may be a block copolymer chain or a random copolymer chain.

Examples of the polyoxyalkylene chain of the polymer A include a polyoxypropylene chain, a polyoxyethylene chain, a poly(oxy-2-ethylethylene) chain, a poly(oxy-1,2-dimethylethylene) chain, a poly(oxytetramethylene) chain, a poly(oxyethylene/oxypropylene) chain, and a poly(oxypropylene/oxy-2-ethylethylene) chain. A polyoxypropylene chain and a poly(oxyethylene/oxypropylene) chain are preferred, and a polyoxypropylene chain is more preferred.

The polymer A has 6 or more terminal groups. The number of terminal groups of the polymer A is preferably from 6 to 8, more preferably from 6 to 7, and still more preferably 6, from the viewpoint of further improving the elastic recovery of the cured product and the durability against repeated expansion and contraction described later.

When the polymer A has 6 or more terminal groups, the cured product has a short tack-free time and excellent deep-part curability.

The terminal group of the polymer A contains one or more groups selected from the group consisting of a reactive silicon group represented by the aforementioned formula (1), an active hydrogen-containing group and an unsaturated group, and preferably contains one or more groups selected from the group consisting of a reactive silicon group represented by the aforementioned formula (1), an active hydrogen-containing group and an allyl group. Each of the terminal groups may be the same as or different from each other.

The total number of reactive silicon groups, active hydrogen-containing groups and unsaturated groups present in the polymer A per terminal group is preferably from 1.0 to 3.0, more preferably from 1.0 to 2.5, and still more preferably from 1.0 to 2.0.

Examples of the active hydrogen-containing group include a hydroxyl group, a carboxy group, an amino group, a monovalent functional group obtained by removing a hydrogen atom from a primary amine, a hydrazide group, and a sulfanyl group. The active hydrogen-containing group is preferably a hydroxyl group, an amino group, or a monovalent functional group obtained by removing a hydrogen atom from a primary amine, and more preferably a hydroxyl group.

Since the elongation properties of the cured product are favorable, the polymer A has 0.3 or more reactive silicon groups per terminal group, preferably from 0.3 to 2.0, more preferably from 0.3 to 1.0, still more preferably from 0.35 to 0.90, and particularly preferably from 0.40 to 0.80.

The polymer A preferably has from 1.8 to 12, more preferably from 1.8 to 8, still more preferably from 2.1 to 7.2, and particularly preferably from 2.4 to 6.4, of the aforementioned reactive silicon groups per molecule.

A ratio of the reactive silicon groups in which a is 0 in the aforementioned formula (1) with respect to the total of the reactive silicon groups, active hydrogen-containing groups and unsaturated groups in the polymer A is not particularly limited, but may be from 0 to 70 mol %, and preferably less than 50 mol % from the viewpoint of improving the durability against repeated expansion and contraction.

The terminal group in the polymer A may contain a group represented by the following formula (2) or (3). $X^1$ in the following formula (3) is a monovalent group represented by any one of the following formulas (4) to (7).

$Si^1$ in the following formulas (2) and (4) to (7) represents a reactive silicon group represented by the above formula (1). When a plurality of Si' groups is present in one terminal group, they may be the same as or different from each other.

[Chemical Formula 1]

Formula (2)

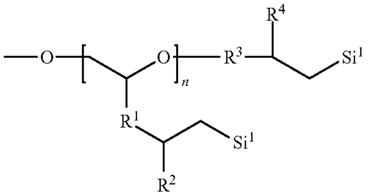

In the formula (2), each of $R^1$ and $R^3$ independently represent a divalent bonding group having 1 to 6 carbon atoms, and an atom bonded to the carbon atom present in the above bonding group is a carbon atom, a hydrogen atom, an oxygen atom, a nitrogen atom, or a sulfur atom.

Examples of $R^1$ and $R^3$ include $—CH_2—$, $—C_2H_4—$, $—C_3H_6—$, $—C_5H_{10}—$, $—C_6H_{12}—$, $—C(CH_3)_2—$, $—CH_2O—$, $—CH_2—O—CH_2—$, $—CH_2—O—CH_2—O—CH_2—$, $—C{\equiv}C—$, $—C({=}O)—$, $—C({=}O)—O—$, $—C({=}O)—NH—$, $—CH{=}N—$ and $—CH{=}N—N{=}CH—$.

$R^1$ is preferably $—CH_2—O—CH_2—$, $—CH_2O—$ or $—CH_2—$, and more preferably $—CH_2—O—CH_2—$.

$R^3$ is preferably $—CH_2—$ or $—C_2H_4—$, and more preferably $—CH_2—$.

Each of $R^2$ and $R^4$ in the formula (2) independently represents a hydrogen atom or a monovalent hydrocarbon group having 1 to 10 carbon atoms.

The hydrocarbon group is preferably a linear or branched alkyl group having 1 to 10 carbon atoms.

Examples of the linear alkyl group include a methyl group, an ethyl group, a propyl group, a butyl group, a pentyl group, a hexyl group, a heptyl group, and an octyl group.

Examples of the branched alkyl group include an isopropyl group, an s-butyl group, a t-butyl group, a 2-methylbutyl group, a 2-ethylbutyl group, a 2-propylbutyl group, a 3-methylbutyl group, a 3-ethylbutyl group, a 3-propylbutyl group, a 2-methylpentyl group, a 2-ethylpentyl group, a 2-propylpentyl group, a 3-methylpentyl group, a 3-ethylpentyl group, a 3-propylpentyl group, a 4-methylpentyl group, a 4-ethylpentyl group, a 4-propylpentyl group, a 2-methylhexyl group, a 2-ethylhexyl group, a 2-propylhexyl group, a 3-methylhexyl group, a 3-ethylhexyl group, a 3-propylhexyl group, a 4-methylhexyl group, a 4-ethylhexyl group, a 4-propylhexyl group, a 5-methylhexyl group, a 5-ethylhexyl group and a 5-propylhexyl group.

Each of $R^2$ and $R^4$ independently preferably represents a hydrogen atom, a methyl group or an ethyl group, and more preferably a hydrogen atom or a methyl group.

n in the formula (2) represents an integer from 1 to 10, preferably from 1 to 7, more preferably from 1 to 5, and still more preferably 1.

[Chemical Formula 2]

$—O—R^5—X^1$ Formula (3)

Formula 94)

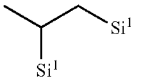

Formula (5)

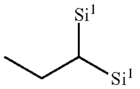

Formula (6)

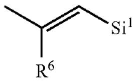

Formula (7)

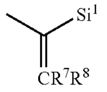

In the formula (3), $R^5$ represents a single bond or a divalent bonding group having 1 to 6 carbon atoms, and an atom bonded to the carbon atom present in the above bonding group is a carbon atom, a hydrogen atom, an oxygen atom, a nitrogen atom, or a sulfur atom.

Examples of the divalent bonding group represented by $R^5$ are the same as those exemplified for the divalent bonding group represented by $R^1$ and $R^3$ described above.

$R^5$ is preferably a single bond or a hydrocarbon group having 1 to 4 carbon atoms, more preferably a single bond or an alkylene group having 1 to 3 carbon atoms, and still more preferably a single bond or a methylene group.

In the formula (6), $R^6$ represents a hydrogen atom or a monovalent hydrocarbon group having 1 to 10 carbon atoms.

Examples of the monovalent hydrocarbon group represented by $R^6$ are the same as those exemplified for the monovalent hydrocarbon group represented by $R^2$ and $R^4$ described above.

$R^6$ is preferably a hydrogen atom, a methyl group, or an ethyl group, and more preferably a hydrogen atom or a methyl group.

Each of $R^7$ and $R^8$ in the formula (7) independently represents a hydrogen atom or a monovalent hydrocarbon group having 1 to 9 carbon atoms.

The hydrocarbon group is preferably a linear or branched alkyl group having 1 to 9 carbon atoms. Examples of the alkyl group represented by $R^7$ and $R^8$ are the same as those exemplified for the alkyl group represented by $R^2$ and $R^4$ described above.

Both $R^7$ and $R^8$ are preferably hydrogen atoms.

The Mn of the polymer A is more than 25,000 and not more than 100,000, preferably from 27,000 to 90,000, more preferably from 28,000 to 80,000, and still more preferably from 30,000 to 60,000. When it is within the above range, the elongation properties and tensile strength of the cured product tend to be favorable.

The hydroxyl group equivalent molecular weight of the polymer A is preferably from 20,000 to 80,000, more preferably from 21,000 to 70,000, still more preferably from 22,000 to 60,000, and particularly preferably from 23,000 to 50,000. When it is within the above range, the elongation properties and tensile strength of the cured product tend to be favorable.

The molecular weight distribution of the polymer A is preferably 1.8 or less. The molecular weight distribution is preferably small, more preferably from 1.0 to 1.5, still more preferably from 1.02 to 1.4, and particularly preferably from 1.04 to 1.3, since favorable elongation properties can be easily obtained.

The polymer A is obtained by introducing the aforementioned reactive silicon group into the terminal group of a precursor polymer. The precursor polymer is an oxyalkylene polymer obtained by ring-opening addition polymerization of a cyclic ether to active hydrogen of an initiator having an active hydrogen-containing group in the presence of a ring-opening polymerization catalyst.

The number of active hydrogens in the initiator, the number of terminal groups in the precursor polymer, and the number of terminal groups in the polymer A are the same.

As the precursor polymer, a polymer having a hydroxyl group as a terminal group, which is obtained by ring-opening addition polymerization of a cyclic ether to an initiator having a hydroxyl group, is preferred.

The method for producing the polymer A is preferably: a method of introducing one unsaturated group with respect to one terminal group of the precursor polymer, and then reacting the unsaturated group with a silylating agent; a method of subjecting an active hydrogen-containing group of a terminal group of the precursor polymer and an isocyanate silane compound to a urethanization reaction; or a method of subjecting an active hydrogen-containing group of a terminal group of the precursor polymer and an isocyanate compound to a urethanization reaction, and then reacting an aminosilane.

Since the main chain of the polymer A is branched, the curable composition containing the polymer A tends to yield a cured product with excellent restorability.

As the initiator, an initiator having 6 or more active hydrogen-containing groups is preferred, an initiator having 6 to 8 active hydrogen-containing groups is more preferred, and an initiator having 6 active hydrogen-containing groups is still more preferred. The active hydrogen-containing group in the initiator is preferably a hydroxyl group.

Examples of the initiator having 6 or more active hydrogen-containing groups include sorbitol, dipentaerythritol, inositol, and sucrose, and sorbitol is preferred from the viewpoint of elongation of cured products.

A conventionally known catalyst can be used as a ring-opening polymerization catalyst during ring-opening addition polymerization of a cyclic ether to an initiator, and examples thereof include alkali catalysts such as KOH, transition metal compound-porphyrin complex catalysts such as a complex obtained by reacting an organic aluminum compound with porphyrin, double metal cyanide complex catalysts, and catalysts composed of phosphazene compounds.

A double metal cyanide complex catalyst is preferred because the molecular weight distribution of the polymer A can be narrowed and a curable composition with a low viscosity can be easily obtained. A conventionally known compound can be used as the double metal cyanide complex catalyst, and a known method can be employed as a method for producing a polymer using a double metal cyanide complex. For example, compounds and production methods disclosed in International Patent Publication No. 2003/062301, International Patent Publication No. 2004/067633, Japanese Unexamined patent application, First Publication No. 2004-269776, Japanese Unexamined Patent Application, First Publication No. 2005-15786, International Patent Publication No. 2013/065802 and Japanese Unexamined Patent Application, First Publication No. 2015-010162 can be used.

As the precursor polymer of the polymer A, a precursor polymer in which all terminal groups are hydroxyl groups is preferred.

Examples of the silylating agent include a compound having both a group capable of forming a bond by reacting with an unsaturated group (for example, sulfanyl group) and the above reactive silicon group, and a hydrosilane compound (for example, $HSiX_aR_{3-a}$, provided that X, R and a are the same as those defined in the aforementioned formula (1)). More specifically, for example, trimethoxysilane, triethoxysilane, triisopropoxysilane, tris(2-propenyloxy)silane, triacetoxysilane, methyldimethoxysilane, methyldiethoxysilane, ethyldimethoxysilane, methyldiisopropoxysilane, (α-chloromethyl)dimethoxysilane, (α-chloromethyl)diethoxysilane, and 3-mercaptopropyltrimethoxysilane can be exemplified. Trimethoxysilane, triethoxysilane, methyldimethoxysilane, and methyldiethoxysilane are preferred, and methyldimethoxysilane or trimethoxysilane is more preferred, from the viewpoint of high activity and favorable curability.

As the isocyanate silane compound, for example, conventionally known isocyanate silane compounds described in Japanese Unexamined Patent Application, First Publication No. 2011-178955 can be used.

A conventionally known method can be used as a method of introducing 1.0 or less unsaturated groups per terminal group with respect to one terminal group of the precursor polymer, and then reacting the unsaturated group with a silylating agent, or a method of subjecting an active hydrogen-containing group of a terminal group of the precursor polymer and an isocyanate silane compound to a urethanization reaction, and examples thereof include methods suggested in each publication of Japanese Examined Patent Application, Second Publication No. Sho 45-36319, Japanese Unexamined Patent Application, First Publication No. Sho 50-156599, Japanese Unexamined Patent Application, First Publication No. Sho 61-197631, Japanese Unexamined Patent Application, First Publication No. Hei 3-72527, Japanese Unexamined Patent Application, First Publication No. Hei 8-231707, Japanese Unexamined Patent Application, First Publication No. 2011-178955, U.S. Pat. Nos. 3,632,557 and 4,960,844.

Further, a conventionally known method can be used as a method of introducing an average of more than 1.0 unsaturated groups per terminal group with respect to one terminal group of the precursor polymer of the polymer A, and then reacting the unsaturated group with a silylating agent.

For example, methods described in International Patent Publication No. 2013/180203, International Patent Publication No. 2014/192842, Japanese Unexamined Patent Application, First Publication No. 2015-105293, Japanese Unexamined Patent Application, First Publication No. 2015-105322, Japanese Unexamined Patent Application, First Publication No. 2015-105323, Japanese Unexamined Patent Application, First Publication No. 2015-105324, International Patent Publication No. 2015/080067, International Patent Publication No. 2015/105122, International Patent Publication No. 2015/111577, International Patent Publication No. 2016/002907, Japanese Unexamined Patent Application, First Publication No. 2016-216633, and Japanese Unexamined Patent Application, First Publication No. 2017-39782 can be used.

As a method for introducing more than 1.0 unsaturated groups per terminal group into the terminal group of the precursor polymer, a method of reacting an epoxy compound having an unsaturated group after allowing an alkali metal salt to act on the precursor polymer, and then reacting a halogenated hydrocarbon compound having an unsaturated group, or a method of reacting a halogenated hydrocarbon compound having a carbon-carbon triple bond after allowing an alkali metal salt to act on the precursor polymer is preferred.

Examples of the alkali metal salt include sodium hydroxide, sodium alkoxide, potassium hydroxide, potassium alkoxide, lithium hydroxide, lithium alkoxide, cesium hydroxide, and cesium alkoxide.

From the viewpoint of ease of handling and solubility, sodium hydroxide, sodium methoxide, sodium ethoxide, potassium hydroxide, potassium methoxide and potassium ethoxide are preferred, and sodium methoxide and potassium ethoxide are more preferred. Sodium methoxide is particularly preferred in view of availability.

The alkali metal salt may be used in a state of being dissolved in a solvent.

Examples of the epoxy compound having an unsaturated group include allyl glycidyl ether, methallyl glycidyl ether, glycidyl acrylate, glycidyl methacrylate, butadiene monoxide, and 1,4-cyclopentadiene monoepoxide. Allyl glycidyl ether is preferred.

A compound represented by the following formula (8) is preferred as the epoxy compound having an unsaturated group.

[Chemical Formula 3]

Formula (8)

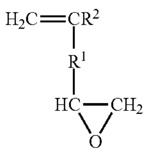

In the formula (8), $R^1$ and $R^2$ are the same as $R^1$ and $R^2$ in the above formula (2).

As the halogenated hydrocarbon compound having an unsaturated group, one or both of a halogenated hydrocarbon compound containing a carbon-carbon double bond and a halogenated hydrocarbon compound containing a carbon-carbon triple bond can be used.

Examples of the halogenated hydrocarbon compound containing a carbon-carbon double bond include vinyl chloride, allyl chloride, methallyl chloride, vinyl bromide, allyl bromide, methallyl bromide, vinyl iodide, allyl iodide, and methallyl iodide. Allyl chloride and methallyl chloride are preferred.

Examples of the halogenated hydrocarbon compound containing a carbon-carbon triple bond include propargyl chloride, 1-chloro-2-butyne, 4-chloro-1-butyne, 1-chloro-2-octyne, 1-chloro-2-pentyne, 1,4-dichloro-2-butyne, 5-chloro-1-pentyne, 6-chloro-1-hexyne, propargyl bromide, 1-bromo-2-butyne, 4-bromo-1-butyne, 1-bromo-2-octyne, 1-bromo-2-pentyne, 1,4-dibromo-2-butyne, 5-bromo-1-pentyne, 6-bromo-1-hexyne, propargyl iodide, 1-iodo-2-butyne, 4-iodo-1-butyne, 1-iodo-2-octyne, 1-iodo-2-pentyne, 1,4-diiodo-2-butyne, 5-iodo-1-pentyne, and 6-iodo-1-hexyne. Propargyl chloride, propargyl bromide and propargyl iodide are preferred.

Two or more types of halogenated hydrocarbon compounds having an unsaturated group may be used in combination.

A derivative in which more than 1.0 unsaturated groups per terminal group of the precursor polymer are introduced is obtained through the above reaction. The derivative of the precursor polymer may contain an unreacted active hydrogen-containing group in the terminal group.

From the viewpoint of storage stability, the number of active hydrogen-containing groups contained in the derivative of the precursor polymer per molecule is preferably 0.3 or less, and more preferably 0.1 or less.

The polymer A is obtained by reacting the unsaturated group of the derivative of the precursor polymer with a silylating agent to introduce a reactive silicon group into the terminal group.

The polymer A obtained in this manner has a terminal group containing a group represented by the above formula (2) or (3).

A silylation rate of the polymer A is preferably from 25 to 100 mol %, and more preferably from 30 to 98 mol %.

When the curable composition contains two or more types of polymer A, the average silylation rate of the entire polymer A may be within the above range.

Polymer B

The polymer B is an oxyalkylene polymer having a reactive silicon group represented by the aforementioned formula (1) and having two or three terminal groups, in which the terminal group contains at least one selected from the group consisting of a reactive silicon group represented by the aforementioned formula (1), an active hydrogen-containing group, and an unsaturated group, and the polymer B has 0.3 to 2.0 of the above reactive silicon groups per terminal group, and has a number average molecular weight of 5,000 to 20,000. Two or more types of polymer B may be used in the curable composition of the present invention.

The main chain of the polymer B is the same as the polymer chain exemplified as the main chain of the polymer A. The number of terminal groups present in one molecule of the polymer B is 2 or 3.

The terminal group of the polymer B contains one or more groups selected from the group consisting of a reactive silicon group represented by the aforementioned formula (1), an active hydrogen-containing group and an unsaturated group, and preferably contains one or more groups selected from the group consisting of a reactive silicon group represented by the aforementioned formula (1), an active hydrogen-containing group and an allyl group. Each of the above terminal groups may be the same as or different from each other.

Since the elongation properties and tensile strength of the cured product are likely to be favorable, the total number of reactive silicon groups, active hydrogen-containing groups and unsaturated groups present in the polymer B per terminal group is preferably from 1.0 to 3.0, more preferably from 1.0 to 2.5, and still more preferably from 1.0 to 2.0.

Since the polymer B has a reactive silicon group represented by the above formula (1), the cured product obtained by the curable composition containing the polymer B has favorable restorability and excellent durability against repeated expansion and contraction. R and X in the above formula (1) are the same as the groups exemplified for the polymer A, and the preferred groups are also the same.

Since the elongation properties and tensile strength of the cured product are likely to be favorable, the number of reactive silicon groups per terminal group in the polymer B is preferably from 0.3 to 2.0, more preferably from 0.35 to 1.90 and still more preferably from 0.40 to 1.80.

The Mn of the polymer B is preferably from 5,000 to 20,000, more preferably from 6,000 to 19,000, and still more preferably from 7,000 to 18,000. When it is within the above range, the elongation properties of the cured product tend to be excellent, and the viscosity tends to be sufficiently low.

The hydroxyl group equivalent molecular weight of the polymer B is preferably from 3,000 to 17,000, more preferably from 4,000 to 15,000, and still more preferably from 5,000 to 12,000. When it is within the above range, the elongation properties of the cured product tend to be excellent, and the viscosity tends to be sufficiently low.

The molecular weight distribution of the polymer B is preferably 1.8 or less. The molecular weight distribution is preferably small, more preferably from 1.0 to 1.5, still more preferably from 1.02 to 1.4, and particularly preferably from 1.04 to 1.3 since favorable elongation properties can be easily obtained.

The number of terminal groups present in one molecule of the polymer B is 2 or 3, and it can be produced using an initiator having 2 or 3 active hydrogen-containing groups.

A compound having two hydroxyl groups is preferred as the compound having two active hydrogen-containing groups. Examples of the compound having two hydroxyl groups include ethylene glycol, diethylene glycol, propylene glycol, dipropylene glycol, triethylene glycol, tripropylene glycol, neopentyl glycol, 1,4-butanediol, 1,6-hexanediol, and low molecular weight polyoxypropylene glycols.

A compound having three hydroxyl groups is preferred as the compound having three active hydrogen-containing groups. Examples of the compound having three hydroxyl groups include glycerin, trimethylolpropane, trimethylolethane, low molecular weight polyoxypropylene triols, and polyoxypropylene triols having a hydroxyl group equivalent molecular weight of 150 to 3,000.

The precursor polymer of the polymer B can be produced in the same manner as that described for the precursor polymer of the polymer A with the exception that a compound having two or three active hydrogen-containing groups is used as an initiator, and a precursor polymer having a hydroxyl group as a terminal group, which is obtained by ring-opening addition polymerization of a cyclic ether to an initiator having a hydroxyl group, is preferred. As a method of introducing an average of 1.0 or less unsaturated groups per terminal group with respect to one terminal group of the precursor polymer and then reacting the unsaturated group with a silylating agent, the same method as that described for the polymer A can be used.

Further, as a method of introducing an average of more than 1.0 unsaturated groups per terminal group with respect to one terminal group of the precursor polymer of the polymer B and then reacting the above unsaturated group with a silylating agent, the same method as that described for the polymer A can be used.

A silylation rate of the polymer B is preferably more than 35 mol % and 100 mol % or less, more preferably from 40 to 98 mol %, and still more preferably from 45 to 90 mol %.

When the curable composition contains two or more types of polymer B, the average silylation rate of the entire polymer B may be within the above range.

A ratio of the reactive silicon groups in which a is 0 in the aforementioned formula (1) with respect to the total of the aforementioned reactive silicon groups, the aforementioned active hydrogen-containing groups and the aforementioned unsaturated groups present in the aforementioned polymer A and the aforementioned polymer B is not particularly limited, but may be from 0 to 60 mol %, and preferably less than 50 mol % from the viewpoint of improving the durability against repeated expansion and contraction.

Polymer C

The polymer C is an oxyalkylene polymer having the above reactive silicon group and having two terminal groups, wherein one of the terminal groups is an inert monovalent organic group, and the other terminal group contains one or more selected from the group consisting of a reactive silicon group represented by the aforementioned formula (1), an active hydrogen-containing group, and an unsaturated group, and the polymer C has 0.2 to 1.0 of the reactive silicon groups per terminal group, and the number average molecular weight of the polymer C is from 2,000 to 15,000. Two or more types of polymer C may be used in the curable composition of the present invention.

Since the number of terminal groups present in one molecule of the polymer C is two and the polymer C has a linear structure, the cured product obtained from the curable composition containing the polymer C has excellent elongation properties.

The main chain of the polymer C is the same as the polymer chain exemplified as the main chain of the polymer A. The reactive silicon group represented by the formula (1) included in the terminal group of the polymer C is the same as the reactive silicon group of the polymer A described above. R and X in the above formula (1) are the same as the groups exemplified for the polymer A, and the preferred groups are also the same.

The inert monovalent organic group as one terminal group of the polymer C is preferably, for example, $R^{10}$—O— ($R^{10}$ is a monovalent hydrocarbon group). $R^{10}$ is preferably a branched or linear alkyl group having 1 to 20 carbon atoms, more preferably a branched or linear alkyl group having 1 to 10 carbon atoms, still more preferably a branched or linear alkyl group having 1 to 4 carbon atoms, and particularly preferably a methyl group, an ethyl group, an isopropyl group, an n-propyl group, an n-butyl group or a t-butyl group.

The other terminal group of the polymer C contains one or more groups selected from the group consisting of a reactive silicon group represented by the aforementioned formula (1), an active hydrogen-containing group and an unsaturated group, and preferably contains one or more groups selected from the group consisting of a reactive silicon group represented by the aforementioned formula (1), an active hydrogen-containing group and an allyl group. The other terminal group of the polymer C may be the terminal group represented by the above formula (2) or (3).

The total number of reactive silicon groups, active hydrogen-containing groups and unsaturated groups present in the polymer C per terminal group is preferably from 0.5 to 1.5, and more preferably from 0.5 to 1.0.

Since the elongation properties of the cured product and the stain resistance of the coating material are likely to be favorable, the number of reactive silicon groups per terminal group in the polymer C is preferably from 0.2 to 1.0, more preferably from 0.25 to 0.95 and still more preferably from 0.30 to 0.90.

The Mn of the polymer C is preferably from 2,000 to 15,000, more preferably from 2,500 to 14,000, and still more preferably from 3,000 to 13,000. When it is within the above range, the elongation properties and the stain resistance of the coating material of the cured product tend to be favorable, and the viscosity tends to be low.

The hydroxyl group equivalent molecular weight of the polymer C is preferably from 1,000 to 10,000, more preferably from 1,500 to 9,000, and still more preferably from 2,000 to 8,000. When it is within the above range, the elongation properties and the stain resistance of the coating material of the cured product tend to be favorable, and the viscosity tends to be low.

The molecular weight distribution of the polymer C is preferably 1.8 or less. The molecular weight distribution is preferably small, more preferably from 1.0 to 1.5, still more preferably from 1.02 to 1.4, and particularly preferably from 1.04 to 1.3, since favorable elongation properties can be easily obtained.

The polymer C is obtained by introducing the aforementioned reactive silicon group into a precursor polymer having a linear structure in which one terminal group is an inert monovalent organic group. As the inert monovalent organic group, the above $R^{10}$—O— ($R^{10}$ is a monovalent hydrocarbon group) is preferred.

The precursor polymer of the polymer C can be produced in the same manner as that described for the precursor polymer of the polymer A or B, with the exception that an initiator having one active hydrogen-containing group, in which one terminal group is an inert monovalent organic group is used. Two or more types of initiators may be used in combination.

The active hydrogen-containing group of the initiator is preferably a hydroxyl group. The precursor polymer is preferably a polymer having one hydroxyl group as a terminal group.

A monohydric alcohol having a linear or branched hydrocarbon group is preferred as the initiator having one hydroxyl group. Specific examples thereof include methyl alcohol, ethyl alcohol, 1-propyl alcohol, 2-propyl alcohol, n-butyl alcohol, isobutyl alcohol, 2-butyl alcohol, t-butyl alcohol, 2-ethylhexanol, decyl alcohol, lauryl alcohol, tridecanol, cetyl alcohol, stearyl alcohol, oleyl alcohol, and low molecular weight polyoxyalkylene monools.

As the method for producing the polymer C, a conventionally known method can be used, and the same method as that described for the polymer B can be used.

The polymer C preferably has two terminal groups in one molecule, in which one terminal group is a residue obtained by removing one active hydrogen from the initiator, that is, an inert monovalent organic group, and the other terminal group contains any of the above reactive silicon groups, active hydrogen-containing groups, or unsaturated groups.

A silylation rate of the polymer C is preferably more than 30 mol % and 100 mol % or less, more preferably from 35 to 97 mol %, and still more preferably from 40 to 95 mol %.

When the curable composition contains two or more types of polymer C, the average silylation rate of the entire polymer C may be within the above range.

Polymer D

The polymer D is an oxyalkylene polymer having no reactive silicon group and a number average molecular weight of 5,000 to 20,000. Two or more types of polymer D may be used in the curable composition of the present invention. The polymer D functions as a plasticizer and contributes to a reduction in the viscosity of the curable composition, a reduction in the contamination on the surface of the cured product, an improvement in the drying properties of the coating material on the surface of the cured product, and an improvement in the stain resistance of the coating material. Examples of the main chain of the polymer D are the same as those of the main chain of the polymer A.

Examples of the oxyalkylene polymer include polyether polyols (for example, polyoxyethylene glycol, polyoxypropylene glycol, and polyoxytetramethylene glycol), and ester or ether derivatives obtained by blocking the hydroxyl groups of the above polyether polyols. Examples of commercially available oxyalkylene polymers include Preminol S3011, Preminol S4012, and Preminol S4013F (all of which are names of products manufactured by AGC Inc.).

The Mn of the polymer D is preferably from 5,000 to 20,000, more preferably from 6,000 to 18,000, and still more preferably from 7,000 to 16,000. When it is within the above range, the stain resistance of the coating material of the cured product tends to be favorable, and the bleed-out tends to be suppressed.

The hydroxyl group equivalent molecular weight of the polymer D is preferably from 3,000 to 15,000, more preferably from 4,000 to 14,000, and still more preferably from 4,500 to 12,000. When it is within the above range, the stain resistance of the coating material of the cured product tends to be favorable, and the bleed-out tends to be suppressed.

The molecular weight distribution of the polymer D is preferably 1.8 or less. From the viewpoint of reducing viscosity, the molecular weight distribution is preferably small, more preferably from 1.0 to 1.6, still more preferably from 1.02 to 1.5, and particularly preferably from 1.04 to 1.4.

The polymer D can be produced in the same manner as the method for producing the precursor polymer of the polymer A, with the exception that an initiator having two active hydrogen-containing groups is used. Two or more types of initiators may be used in combination. A compound having two hydroxyl groups is preferred as the compound having two active hydrogen-containing groups. Examples of the compound having two hydroxyl groups include ethylene glycol, propylene glycol and tetramethylene glycol.

Curable Composition

The curable composition is obtained by mixing the polymer A and other necessary components.

A ratio of the polymer A with respect to the total mass of the curable composition is preferably from 1 to 50% by mass, more preferably from 2 to 45% by mass, and still more preferably from 4 to 40% by mass. When it is within the above range, the cured product obtained from the curable composition is excellent in durability against repeated expansion and contraction and elongation.

When the curable composition contains the polymer B, a ratio of the polymer B with respect to the total mass of the curable composition is preferably from 1 to 30% by mass, more preferably from 2 to 28% by mass, and still more preferably from 3 to 25% by mass. When it is within the above range, the cured product obtained from the curable composition is excellent in durability against repeated expansion and contraction and elongation.

When the curable composition contains the polymer B, a ratio of the polymer A with respect to the total mass of the polymer A and the polymer B is preferably from 20 to 95% by mass, more preferably from 30 to 90% by mass, and still more preferably from 40 to 80% by mass. When it is within the above range, the cured product obtained from the curable composition has favorable elongation properties and low viscosity.

When the curable composition contains the polymer C, a ratio of the polymer C with respect to the total mass of the polymer A and the polymer B is preferably from 1 to 200% by mass, more preferably from 20 to 190% by mass, and still more preferably from 30 to 180% by mass. When it is within the above range, the cured product obtained from the curable composition has favorable stain resistance of the coating material and low viscosity.

When the curable composition contains the polymer D, a ratio of the polymer D with respect to the total mass of the polymer A and the polymer B is preferably from 10 to 180% by mass, more preferably from 15 to 100% by mass, still more preferably from 15 to 90% by mass, and particularly preferably from 20 to 80% by mass. When it is within the above range, the cured product obtained from the curable composition has favorable stain resistance of the coating material and low viscosity.

As shown in the Examples described later, the value of durability against repeated expansion and contraction of the cured product obtained by curing the curable composition of the present invention is likely to be 3,500 times or more, and more likely to be 4,000 times or more. If it is 3,500 times or more, the cured product can follow structural contraction even when exposed to an outdoor environment for a prolonged period of time and has durability against repeated expansion and contraction suitable as a sealing material for construction.

As shown in the Examples described later, the value of the maximum elongation of the cured product obtained by curing the curable composition of the present invention is likely to be 370% or more, and more likely to be 400% or more. If the value of the maximum elongation is 370% or more, favorable elongation can be obtained, which is suitable as a sealing material for construction.

The curable composition may be a one-component type in which all of the polymer and other components are blended in advance, sealed and stored, and cured by moisture in the air after application; or may be a two-component type in which a main agent composition containing at least a polymer having a reactive silicon group and a curing agent composition containing at least a curing catalyst are stored separately, and the curing agent composition and the main agent composition are mixed before use. A one-component type curable composition is preferred due to ease of application.

It is preferable that the one-component type curable composition does not contain water. It is preferable to preliminarily dehydrate and dry the added components containing water, or to dehydrate them by reducing the pressure during the mixing and kneading process.

In the two-component type curable composition, the curing agent composition may contain water. Although the main agent composition hardly gels even when it contains a small amount of water, it is preferable to dehydrate and dry the added components in advance from the viewpoint of storage stability.

A dehydrating agent may be added to the one-component type curable composition or the two-component type main agent composition in order to improve the storage stability.

The viscosity of the polymer A at 25° C. or the viscosity of a mixture obtained by mixing the polymer A and the polymer B at 25° C. is preferably 25 Pas or less, more preferably from 3 to 25 Pas, and still more preferably from 4 to 20 Pas. When the viscosity of the polymer A or the viscosity of the mixture of the polymer A and the polymer B is equal to or more than the lower limit value of the above range, dripping during operation is unlikely to occur, and when the viscosity is equal to or less than the upper limit value, the workability tends to be favorable.

For example, in the case of a two-component type curable composition, the curable composition may contain a main agent composition, which is a mixture of the polymer A and the polymer B, and a curing agent composition containing other components. In this case, the viscosity of the main agent composition at 25° C. is preferably 25 Pas or less, more preferably from 3 to 25 Pas, and still more preferably from 4 to 20 Pas.

Other Components

Examples of other components described above include polymers other than the polymers A to E, curable compounds, curing catalysts (silanol condensation catalysts), fillers, plasticizers, thixotropic agents, stabilizers, antioxidants, ultraviolet absorbers, dehydrating agents, adhesion-imparting agents, physical property modifiers, tackifying resins, and reinforcing materials such as fillers, surface modifiers, flame retardants, foaming agents, solvents, and silicates.

Conventionally known components described in International Patent Publication No. 2013/180203, International Patent Publication No. 2014/192842, International Patent Publication No. 2016/002907, Japanese Unexamined Patent Application, First Publication No. 2014-88481, Japanese Unexamined Patent Application, First Publication No. 2015-10162, Japanese Unexamined Patent Application, First Publication No. 2015-105293, Japanese Unexamined Patent Application, First Publication No. 2017-039728, Japanese Unexamined Patent Application, First Publication No. 2017-214541 and the like can be used in combination without limitation as other components. Two or more types of each component may be used in combination.

Action Mechanism

The curable composition of the present invention is a curable composition containing an oxyalkylene polymer A having a reactive silicon group represented by the above formula (1) and having 6 or more terminal groups, in which the terminal group contains one or more selected from the group consisting of a reactive silicon group represented by the following formula (1), an active hydrogen-containing group, and an unsaturated group, and the oxyalkylene polymer A has 0.3 or more of the reactive silicon groups per terminal group, and the number average molecular weight of the oxyalkylene polymer A is more than 25,000 and not more than 100,000. Furthermore, it may contain either one or both of: an oxyalkylene polymer B having a reactive silicon group represented by the aforementioned formula (1) and having two or three terminal groups, in which the terminal group contains at least one selected from the group consisting of a reactive silicon group represented by the aforementioned formula (1), an active hydrogen-containing group, and an unsaturated group, and having 0.3 to 2.0 of the above reactive silicon groups per terminal group and a number average molecular weight of 5,000 to 20,000; and an oxyalkylene polymer C having the above reactive silicon group and having two terminal groups, in which one of the terminal groups is an inert monovalent organic group, and the other terminal group contains one or more selected from the group consisting of a reactive silicon group represented by the aforementioned formula (1), an active hydrogen-containing group, and an unsaturated group, and having 0.2 to 1.0 of the reactive silicon groups per terminal group and a number average molecular weight of 2,000 to 15,000. As shown in the Examples described later, since the obtained cured product has favorable durability against repeated expansion and contraction, the curable composition is particularly suitable as a sealing material for exterior walls that are exposed to the outdoors for a long period of time. When the curable composition of the present invention is used as a sealing material for exterior walls, since it has excellent durability against repeated expansion and contraction, follows structural changes in adherends over time, and is unlikely to cause cracking, the appearance is easily maintained in a favorable manner.

Use

The curable composition can be used as a curable composition for a sealant or an adhesive. As specific applications of the curable composition, sealing materials (for example, elastomeric sealing materials for construction, sealing materials for double glazing, sealing materials for rust prevention and waterproofing of glass edges, sealing materials for back surfaces of solar cells, building sealants, marine sealants, automobile sealants, and road sealants), electrical insulating materials (insulating coating materials for electric wires and cables), adhesives, coating materials and potting materials are suitable.

In particular, it is suitable for applications that require durability against repeated expansion and contraction, such as sealing materials that are applied outdoors. When used as a sealing material, since a coating material may be applied onto the sealing material, it is necessary that the sealing material does not deteriorate the curing performance of the coating material as well as the adhesion between the sealing material and the coating material. When a sealing material is formed using the curable composition of the present invention and a coating material is applied thereon, the sealing material exhibits favorable stain resistance of the coating film.

EXAMPLES

The present invention will be described in detail below with reference to Examples, but the present invention is not limited by the following description.

Molecular Weight of Precursor Polymer

A molecular weight of an oxyalkylene polymer obtained by polymerizing an alkylene oxide to an initiator having a hydroxyl group, in which a terminal group was a hydroxyl group (hereinafter referred to as a "precursor polymer") was calculated based on a formula of "56,100/(hydroxyl value of precursor polymer)×(the number of active hydrogens in the initiator" (hereinafter referred to as a "hydroxyl group equivalent molecular weight"), using a hydroxyl value calculated based on JIS K 1557 (2007).

[Number Average Molecular Weight (Mn) and Molecular Weight Distribution (Mw/Mn)]

The measurement was performed using a gel permeation chromatograph analyzer HLC-8220 GPC (name of a product manufactured by Tosoh Corporation). TSKgel Supermultipore HZ-M (name of a product manufactured by Tosoh Corporation) was used as a column, and tetrahydrofuran was used as a solvent. Mw, Mn and Mw/Mn were obtained by setting the sample pump to 0.350 mL/min, the reference pump to 0.350 mL/min, the detector temperature to 40° C. and the collection time to 6 to 15 minutes, and analyzing the peaks appearing between collection times of 6 and 11 minutes.

Silylation Rate, Number of Silyl Groups

In a method of introducing an unsaturated group into a terminal group of a precursor polymer using allyl chloride and reacting a silylating agent with the unsaturated group to introduce a reactive silicon group, a charged equivalent of the reactive silicon group of the silylating agent with respect to the unsaturated group introduced into the terminal group was taken as a silylation rate (mol %).

In a reaction of the unsaturated group introduced into the terminal group of the precursor polymer using allyl chloride with the silylating agent, approximately 10 mol % of the unsaturated group do not react with the silylating agent due to a side reaction. Therefore, when less than 90 mol % of the unsaturated groups are reacted with the silylating agent, the charged equivalent is equal to the silylation rate.

In a method of subjecting a hydroxyl group of the precursor polymer and an isocyanate silane compound to a urethanization reaction, a charged equivalent of an isocyanate group of the isocyanate silane compound with respect to the hydroxyl group of the precursor polymer was taken as a silylation rate (mol %).

Measurement of Viscosity

The viscosity of a polymer mixture was measured using an E-type viscometer (RE80 (product name), manufactured by Toki Sangyo Co., Ltd.) under conditions of a measurement temperature of 25° C. and a rotor No. 4.

Evaluation of Tensile Properties

The tensile properties were measured as described below.

A surface anodized aluminum plate obtained by applying a primer (MP-2000 (product name), manufactured by Cemedine Co., Ltd.) on the surface was used as an adherend, and a test specimen was produced and a tensile property test was carried out in accordance with Testing methods of sealants for sealing and glazing in buildings in JIS A 1439 5.2 (2016).

More specifically, the curable composition was poured into a space formed by sandwiching a spacer between the above two aluminum plates, cured at a temperature of 23° C. and a humidity of 50% for 7 days, and further cured at a temperature of 50° C. and a humidity of 65% for 7 days to obtain a test specimen. The obtained test specimen was subjected to a tensile property test using a Tensilon testing machine, and the stress at 50% elongation (hereinafter referred to as "M50", unit: Ninini 2), the maximum cohesive strength (unit: $N/mm^2$, described as "Tmax" in the tables)

and the maximum elongation (unit: %, described as "elongation" in the tables) were measured.

The smaller the M50 value, the softer the cured product. The larger the maximum cohesive strength value, the higher the tensile strength of the cured product. The larger the maximum elongation value, the better the elongation of the cured product. When the maximum elongation was 400% or more, it was evaluated as favorable elongation.

Evaluation of Elastic Recovery

The above-mentioned elastic recovery rate was measured as described below. A surface anodized aluminum plate obtained by applying a primer (MP-2000 (product name), manufactured by Cemedine Co., Ltd.) on the surface was used as an adherend, and an aluminum adherend was produced and an elastic recovery test was carried out in accordance with Testing methods of sealants for sealing and glazing in buildings in JIS A 1439 5.2 (2016).

More specifically, in the same manner as in the evaluation of tensile properties described above, the curable composition was poured between the above two aluminum plates, cured at a temperature of 23° C. and a humidity of 50% for 7 days, and further cured at a temperature of 50° C. and a humidity of 65% for 7 days to obtain an aluminum adherend. A distance between the two aluminum plates of the obtained aluminum adherend was defined as L0. A predetermined jig was used to extend the distance between the two aluminum plates by 100% with respect to L0 under an environment of a temperature of 23° C. and a humidity of 50%. A distance between the two aluminum plates at this time was defined as L1. After keeping the distance between the two aluminum plates at L1 for 24 hours, the jig was removed, and the rest was allowed to stand for 1 hour, and a distance between the two aluminum plates was measured as L2. From the above values of L0, L1 and L2, the elastic recovery rate (unit: %) was determined by the following formula (9). The higher the elastic recovery rate value, the better the restorability (recoverability). If the elastic recovery rate was 50% or more, the recoverability was evaluated as favorable.

$$\text{Elastic recovery rate}=((L1-L2)/(L1-L0))\times 100 \quad (9)$$

Evaluation of Durability Against Repeated Expansion and Contraction

An evaluation method for durability against repeated expansion and contraction was performed as described below.

A surface anodized aluminum plate obtained by applying a primer (MP-2000 (product name), manufactured by Cemedine Co., Ltd.) on the surface was used as an adherend, and a durability test specimen of type 1 was produced and subjected to a durability test against repeated expansion and contraction (also referred to as CR80) in accordance with Testing methods of sealants for sealing and glazing in buildings in JIS A 1439 (2016).

More specifically, the curable composition was poured into a space formed by sandwiching a spacer between the above two aluminum plates, cured at a temperature of 23° C. and a humidity of 50% for 7 days, and further cured at a temperature of 50° C. and a humidity of 65% for 7 days to obtain a durability test specimen of type 1. The obtained durability test specimen of type 1 was fixed at a compressive deformation rate of 30% using a compression fixing spacer, and allowed to stand at a temperature of 80° C. for 1 day, followed by removal of the compression fixing spacer, and was then allowed to stand at a temperature of 23° C. and a humidity of 50% for 1 day. By setting the initial joint width to 12 mm, the obtained test specimen was subjected to repeated expansion and contraction of 30% with respect to the initial joint width at a speed of 5 times/minute. The state near the interface between the aluminum plate and the cured product of the curable composition of the test specimen was observed, and the number of expansions and contractions at which the depth of adhesive failure or cohesive failure reached 0.5 mm or more was measured.

Evaluation of Stain Resistance of Coating Material

The "stain resistance of coating material" represent the effect of the cured product on the curing performance of the coating material, and were measured by the following evaluation method.

The curable composition was applied onto an aluminum plate in a shape with a length of 50 mm, a width of 50 mm, and a thickness of 10 mm, and cured and hardened at a temperature of 23° C. and a humidity of 50% for 48 hours. A one-component aqueous reaction-curing type silicone resin coating material (0-DE FRESH Si100II (product name) manufactured by Nippon Paint Co., Ltd.) was applied onto the obtained cured product. Subsequently, the resulting product was cured at 50° C. for 1 week and allowed to stand at 23° C. for 1 day, and then a well-dried contaminant powder was sprinkled onto the entire surface coated with the silicone resin coating material, and after allowing the resulting product to stand for 10 minutes, the contaminating powder that did not adhere was shaken off. With regard to the evaluation results, those in which almost no adhesion of contaminant powder was observed and the color of the curable composition was maintained were evaluated as "A (excellent)", and those in which a large amount of contaminant powder was adhered and the color of the curable composition was deteriorated were evaluated as "B (unsatisfactory)". It should be noted that as the contaminant powder, JIS Test Powder 1, Class 8 (Kanto loam) (manufactured by The Association of Powder Process Industry and Engineering, Japan) was used.

Synthesis of polymer A, polymer B to polymer E

Synthesis Example 1: polymer A1

Propylene oxide was polymerized using sorbitol as an initiator and a zinc hexacyanocobaltate complex with t-butyl alcohol as a ligand (hereinafter referred to as "TBA-DMC catalyst") as a catalyst to obtain an oxypropylene polymer (precursor polymer). The hydroxyl group equivalent molecular weight of the precursor polymer was 23,000. Then, the precursor polymer was alcoholated by adding 1.05 molar equivalents of a methanol solution of sodium methoxide with respect to the hydroxyl group of the precursor polymer. Next, methanol was distilled off by heating under reduced pressure, and allyl chloride was further added in an excess amount relative to the amount of hydroxyl groups in the precursor polymer to convert the terminal group to an allyl group. Then, in the presence of chloroplatinic acid hexahydrate, 0.5 molar equivalents of methyldimethoxysilane were added with respect to the converted allyl group of the precursor polymer, and the resulting mixture was reacted at 70° C. for 5 hours to obtain an oxypropylene polymer (polymer A1) in which a methyldimethoxysilyl group was introduced into the terminal group.

The number of terminal groups, the terminal group structure, the hydroxyl group equivalent molecular weight, Mn, Mw/Mn, the total number of reactive silicon groups, active hydrogen-containing groups and unsaturated groups (described as the number of Z groups in Table 1), the silylation rate, the ratio of trialkoxysilyl groups with respect to the number of Z groups, and the number of reactive silicon groups per terminal group, of the obtained polymer A1 are shown in Table 1. Polymers obtained in the following Synthesis Examples are also shown in Table 1 in the same manner.

It should be noted that in Table 1, “dimethoxy” in the terminal group structure indicates that the reactive silicon group present in the terminal group is a methyldimethoxysilyl group, “trimethoxy” indicates that the reactive silicon group present in the terminal group is a trimethoxysilyl group, “dimethoxySIU” indicates that the reactive silicon group present in the terminal group is a methyldimethoxysilyl group bonded to the main chain via a urethane bond, and “trimethoxySIU” indicates that the reactive silicon group present in the terminal group is a trimethoxysilyl group bonded to the main chain via a urethane bond.

Synthesis Example 2: Polymer A2

An oxypropylene polymer (polymer A2) in which a methyldimethoxysilyl group was introduced into the terminal group was obtained in the same manner as in Synthesis Example 1, with the exception that the hydroxyl group equivalent molecular weight of the precursor polymer was changed to 30,000.

Synthesis Example 3: Polymer A3

An oxypropylene polymer (polymer A3) in which a methyldimethoxysilyl group was introduced into the terminal group was obtained in the same manner as in Synthesis Example 1, with the exception that the hydroxyl group equivalent molecular weight of the precursor polymer was changed to 42,000.

Synthesis Example 4: Polymer A4

An oxypropylene polymer (polymer A4) in which a methyldimethoxysilyl group was introduced into the terminal group was obtained in the same manner as in Synthesis Example 3, with the exception that 0.75 molar equivalents of methyldimethoxysilane were added with respect to the converted allyl group of the precursor polymer.

Synthesis Example 5: Polymer A5

The hydroxyl group of the precursor polymer obtained in Synthesis Example 3 was converted to an allyl group in the same manner as in Synthesis Example 3. Then, in the presence of 2,2'-azobis(2-methylbutyronitrile), 0.30 molar equivalents of 3-mercaptopropyltrimethoxysilane were added with respect to the converted allyl group of the precursor polymer, and the resulting mixture was reacted at 70° C. for 12 hours to obtain an oxypropylene polymer (polymer A5) in which a trimethoxysilyl group was introduced into the terminal group.

Synthesis Example 6: Polymer A6

An oxypropylene polymer (polymer A6) in which a trimethoxysilyl group was introduced into the terminal group was obtained in the same manner as in Synthesis Example 5, with the exception that 0.70 molar equivalents of 3-mercaptopropyltrimethoxysilane were added with respect to the converted allyl group of the precursor polymer.

Synthesis Example 7: Polymer A7

50 ppm of dioctyltin bisisooctylthioglycolate was added as a urethanization catalyst to the precursor polymer obtained in Synthesis Example 2. 0.50 molar equivalents of 3-isocyanatopropylmethyldimethoxysilane were added with respect to the hydroxyl group of the precursor polymer, and the resulting mixture was reacted at 80° C. for 2 hours to obtain an oxypropylene polymer (polymer A7) having a urethane bond in which a methyldimethoxysilyl group was introduced into the terminal group.

Synthesis Example 8: Polymer A8

An oxypropylene polymer (polymer A8) having a urethane bond in which a methyldimethoxysilyl group was introduced into the terminal group was obtained in the same manner as in Synthesis Example 7, with the exception that 0.97 molar equivalents of 3-isocyanatopropylmethyldimethoxysilane were added with respect to the hydroxyl group of the precursor polymer.

Synthesis Example 9: Polymer A9

An oxypropylene polymer (polymer A9) having a urethane bond in which a trimethoxysilyl group was introduced into the terminal group was obtained in the same manner as in Synthesis Example 7, with the exception that 0.97 molar equivalents of 3-isocyanatopropyltrimethoxysilane were added with respect to the hydroxyl group of the precursor polymer.

Synthesis Example 10: Polymer A10

An oxypropylene polymer (polymer A10) having a urethane bond in which a trimethoxysilyl group was introduced into the terminal group was obtained in the same manner as in Synthesis Example 9, with the exception that the precursor polymer obtained in Synthesis Example 3 was used.

Synthesis Example 11: Polymer a1

An oxypropylene polymer (polymer a1) in which a methyldimethoxysilyl group was introduced into the terminal group was obtained in the same manner as in Synthesis Example 1, with the exception that the hydroxyl group equivalent molecular weight of the precursor polymer was changed to 15,000.

Synthesis Example 12: Polymer B1

An oxypropylene polymer (polymer B1) in which a methyldimethoxysilyl group was introduced into the terminal group was obtained in the same manner as in Synthesis Example 1, with the exception that a precursor polymer having a hydroxyl group equivalent molecular weight of 10,000 was obtained using propylene glycol as an initiator.

Synthesis Example 13: Polymer B2

An oxypropylene polymer (polymer B2) in which a methyldimethoxysilyl group was introduced into the terminal group was obtained in the same manner as in Synthesis Example 12, with the exception that a precursor polymer having a hydroxyl group equivalent molecular weight of 8,000 was obtained.

Synthesis Example 14: Polymer B3

Propylene oxide was polymerized using propylene glycol as an initiator in the presence of a TBA-DMC catalyst to obtain a precursor polymer having a hydroxyl group equivalent molecular weight of 12,000. Then, the precursor polymer was alcoholated by adding 1.05 molar equivalents of a methanol solution of sodium methoxide with respect to the hydroxyl group of the precursor polymer. Next, methanol was distilled off by heating under reduced pressure, 1.05 molar equivalents of allyl glycidyl ether was further added relative to the amount of hydroxyl groups in the precursor polymer, and the resulting mixture was reacted at 130° C. for 2 hours. Thereafter, additional 0.28 molar equivalents of a methanol solution of sodium methoxide were added to distill off methanol, allyl chloride was further added in an excess amount relative to the amount of hydroxyl groups in the precursor polymer, and the resulting mixture was reacted at 130° C. for 2 hours to convert the terminal group to an allyl group. Then, in the presence of a platinum divinyldisiloxane complex, 0.6 molar equivalents of methyldimethoxysilane were added with respect to the converted allyl group of the precursor polymer, and the resulting mixture was reacted at 70° C. for 5 hours to obtain an oxypropylene polymer (polymer B3) in which a methyldimethoxy silyl group was introduced into the terminal group.

Synthesis Example 15: Polymer B4

An oxypropylene polymer (polymer B4) in which a methyldimethoxysilyl group was introduced into the terminal group was obtained in the same manner as in Synthesis Example 1, with the exception that a precursor polymer having a hydroxyl group equivalent molecular weight of 10,000 was obtained using glycerin as an initiator.

Synthesis Example 16: Polymer B5

An oxypropylene polymer (polymer B5) having a urethane bond in which a trimethoxysilyl group was introduced into the terminal group was obtained in the same manner as in Synthesis Example 9, with the exception that the precursor polymer obtained in Synthesis Example 14 was used.

Synthesis Example 17: Polymer $C_1$

Propylene oxide was polymerized using n-butyl alcohol as an initiator in the presence of a TBA-DMC catalyst to obtain a precursor polymer having a hydroxyl group equivalent molecular weight of 5,000. Then, the hydroxyl group of the precursor polymer was converted to an allyl group in the same manner as in Synthesis Example 1, and 0.80 molar equivalents of methyldimethoxysilane was added with respect to the allyl group to obtain an oxypropylene polymer (polymer $C_1$) in which a methyldimethoxysilyl group was introduced into the terminal group.

Synthesis Example 18: Polymer $C_2$

Propylene oxide was polymerized using n-butyl alcohol as an initiator in the presence of a TBA-DMC catalyst to obtain a precursor polymer having a hydroxyl group equivalent molecular weight of 5,000. Then, an oxypropylene polymer (polymer $C_2$) in which a methyldimethoxysilyl group was introduced into the terminal group was obtained by the method described in Synthesis Example 14, with the exception that 0.80 molar equivalents of methyldimethoxysilane were added with respect to the converted allyl group of the precursor polymer.

Synthesis Example 19: Polymer D1

Propylene oxide was polymerized using propylene glycol as an initiator in the presence of a TBA-DMC catalyst to obtain an oxyalkylene polymer (polymer D1) having a hydroxyl group equivalent molecular weight of 10,000.

Synthesis Example 20: Polymer D2

Propylene oxide was polymerized using propylene glycol as an initiator in the presence of a KOH catalyst to obtain an oxyalkylene polymer (polymer D2) having a hydroxyl group equivalent molecular weight of 3,000.

Synthesis Example 21: Polymer E1

Propylene oxide was polymerized using glycerin as an initiator in the presence of a TBA-DMC catalyst to obtain a precursor polymer having a hydroxyl group equivalent molecular weight of 24,000. Then, the hydroxyl group of the precursor polymer was converted to an allyl group in the same manner as in Synthesis Example 1, and 0.63 molar equivalents of methyldimethoxysilane was added with respect to the allyl group to obtain an oxypropylene polymer (polymer E1) in which a methyldimethoxysilyl group was introduced into the terminal group.

Synthesis Example 22: Polymer E2

An oxypropylene polymer (polymer E2) in which a methyldimethoxysilyl group was introduced into the terminal group was obtained in the same manner as in Synthesis Example 21, with the exception that a precursor polymer having a hydroxyl group equivalent molecular weight of 32,000 was obtained using pentaerythritol as an initiator.

Synthesis Example 23: Polymer E3

An oxypropylene polymer (polymer E3) having a urethane bond in which a trimethoxysilyl group was introduced into the terminal group was obtained in the same manner as in Synthesis Example 9, with the exception that the precursor polymer obtained in Synthesis Example 21 was used.

Other Components

The additives listed in Tables 2 to 5 are as follows. Table 3 shows the mass ratio of the components contained in the "catalyst A" described in Table 2.

WHITON SB: heavy calcium carbonate, name of a product manufactured by Shiraishi Kogyo Kaisha, Ltd.

HAKUENKA CCR: colloidal calcium carbonate, name of a product manufactured by Shiraishi Kogyo Kaisha, Ltd.

Titanium oxide R820: titanium oxide, name of a product manufactured by Ishihara Sangyo Kaisha, Ltd.

Balloon 80GCA: organic balloon, name of a product manufactured by Matsumoto Yushi-Seiyaku Co., Ltd.

Glomax LL: calcined kaolin, name of a product manufactured by Takehara Kagaku Kogyo Co., Ltd.

Sanso Cizer EPS: 4,5-epoxycyclohexane-1,2-dicarboxylic acid-di-2-ethylhexyl, name of a product manufactured by New Japan Chemical Co., Ltd.

Disparlon 6500: fatty acid amide wax, name of a product manufactured by Kusumoto Chemicals, Ltd.

Disparlon 305: hydrogenated castor oil-based thixotropic agent, name of a product manufactured by Kusumoto Chemicals, Ltd.

Aronix M-309: photocurable resin, name of a product manufactured by Toagosei Co., Ltd.

IRGANOX 1010: hindered phenolic antioxidant, name of a product manufactured by BASF Japan Ltd.

IRGANOX 1135: hindered phenolic antioxidant, name of a product manufactured by BASF Japan Ltd.

TINUVIN 326: benzotriazole-based ultraviolet absorber, name of a product manufactured by BASF Japan Ltd.

KBM-1003: vinyltrimethoxysilane, name of a product manufactured by Shin-Etsu Chemical Co., Ltd.

KBM-403: 3-glycidyloxypropyltrimethoxysilane, name of a product manufactured by Shin-Etsu Chemical Co., Ltd.

KBM-603: 3-(2-aminoethylamino)propyltrimethoxysilane, name of a product manufactured by Shin-Etsu Chemical Co., Ltd.

DINP: Vinycizer 90, diisononyl phthalate, a product of Kao Corporation.

U-220H: dibutyltin bis(acetylacetonate), tin catalyst, name of a product manufactured by manufactured by Nitto Kasei Co., Ltd.

U-810: dioctyl tin laurate, tin catalyst, name of a product manufactured by Nitto Kasei Co., Ltd.

U-830: dioctyl tin versatate, tin catalyst, name of a product manufactured by Nitto Kasei Co., Ltd.

Stanoct: stannous octoate, name of a product manufactured by Mitsubishi Chemical Corporation.

K-KAT 670: titanium catalyst, name of a product manufactured by King Industries, Inc.

Preparation of Curable Composition

Cases 1 to 3, 6 to 22 and 27 to 35 are Examples of the present invention, and Cases 4, 5, 23 to 26 are Comparative Examples.

Cases 1 to 26

A curable composition was prepared by adding a polymer having the composition shown in Table 4 or 5 and an additive. The unit of the blending amount of each component shown in Tables 2 to 5 is "parts by mass".

Using the obtained curable composition, the tensile property test, elastic recovery test, evaluation of durability against repeated expansion and contraction, evaluation of stain resistance of the coating material, and viscosity measurement of polymer A, polymer a, or a mixture of polymer A and polymer B were performed by the above methods. These results are shown in Tables 4 and 5.

Cases 27 to 35

The additive was changed to an additive 2 in Table 2 with respect to 100 parts by mass of polymers A1 to A9 in Table 1 to prepare each curable composition, and a tensile test and an elastic recovery test were performed. All of the obtained cured products had favorable elongation and favorable recoverability in the above tensile test and elastic recovery test.

TABLE 1

| Nane | Number of terminal groups | Terminal group structure | Hydroxyl group equivalent molecular weight | Mn | Mw/Mn | Number of Z groups | Silylation rate (mol %) | Ratio of trialkoxysilyl group (mol %) | Number of reactive silicon groups per terminal group |
|---|---|---|---|---|---|---|---|---|---|
| Polymer A1 | 6 | Dimethoxy | 23,000 | 30,000 | 1.19 | 6 | 50 | 0 | 0.50 |
| Polymer A2 | 6 | Dimethoxy | 30,000 | 39,000 | 1.21 | 6 | 50 | 0 | 0.50 |
| Polymer A3 | 6 | Dimethoxy | 42,000 | 50,000 | 1.23 | 6 | 50 | 0 | 0.50 |
| Polymer A4 | 6 | Dimethoxy | 42,000 | 50,000 | 1.27 | 6 | 75 | 0 | 0.75 |
| Polymer A5 | 6 | Trimethoxy | 42,000 | 50,000 | 1.18 | 6 | 30 | 30 | 0.30 |
| Polymer A6 | 6 | Trimethoxy | 42,000 | 50,000 | 1.27 | 6 | 70 | 70 | 0.70 |
| Polymer A7 | 6 | DimethoxySIU | 30,000 | 39,000 | 1.29 | 6 | 50 | 0 | 0.50 |
| Polymer A8 | 6 | DimethoxySIU | 30,000 | 39,000 | 1.28 | 6 | 97 | 0 | 0.97 |
| Polymer A9 | 6 | TrimethoxySIU | 30,000 | 39,000 | 1.28 | 6 | 97 | 97 | 0.97 |
| Polymer A10 | 6 | TrimethoxySIU | 42,000 | 50,000 | 1.23 | 6 | 97 | 97 | 0.97 |
| Polymer a1 | 6 | Dimethoxy | 15,000 | 20,000 | 1.12 | 6 | 50 | 0 | 0.50 |
| Polymer B1 | 2 | Dimethoxy | 10,000 | 15,000 | 1.08 | 2 | 50 | 0 | 0.50 |
| Polymer B2 | 2 | Dimethoxy | 8,000 | 12,000 | 1.06 | 2 | 50 | 0 | 0.50 |
| Polymer B3 | 2 | Dimethoxy | 12,000 | 18,000 | 1.12 | 4 | 60 | 0 | 1.20 |
| Polymer B4 | 3 | Dimethoxy | 10,000 | 15,000 | 1.10 | 3 | 50 | 0 | 0.50 |
| Polymer B5 | 2 | TrimethoxySIU | 12,000 | 18,000 | 1.14 | 2 | 97 | 97 | 0.97 |
| Polymer C1 | 2 | Dimethoxy | 5,000 | 8,000 | 1.05 | 1 | 80 | 0 | 0.40 |
| Polymer C2 | 2 | Dimethoxy | 5,000 | 8,000 | 1.05 | 2 | 80 | 0 | 0.80 |
| Polymer E1 | 3 | Dimethoxy | 24,000 | 31,000 | 1.15 | 3 | 63 | 0 | 0.63 |
| Polymer E2 | 4 | Dimethoxy | 32,000 | 42,000 | 1.22 | 4 | 63 | 0 | 0.63 |
| Polymer E3 | 3 | TrimethoxySIU | 24,000 | 31,000 | 1.30 | 3 | 97 | 97 | 0.97 |

TABLE 2

| | | Additive 1 | Additive 2 | Additive 3 |
|---|---|---|---|---|
| Filler | WHITON SB | 75.0 | 165.0 | — |
| | HAKUENKA CCR | 75.0 | 45.0 | — |
| | Titanium oxide R820 | — | 10.0 | — |
| | Balloon 80GCA | — | 1.5 | — |
| Plasticizer | Polymer D1 | — | 50.0 | — |
| | Sanso Cizer EPS | — | 25.0 | — |
| Thixotropic | Disparlon 6500 | 3.0 | — | — |

TABLE 2-continued

| | | Additive 1 | Additive 2 | Additive 3 |
|---|---|---|---|---|
| agent | Disparlon 305 | — | 4.0 | — |
| Curable compound | Aronix M-309 | — | 3.0 | — |
| Antioxidant | IRGANOX 1010 | 1.0 | — | — |
| | IRGANOX 1135 | — | 1.0 | — |
| Ultraviolet absorber | TINUVIN 326 | 1.0 | 1.0 | — |
| Dehydrating agent | KBM-1003 | 3.0 | — | 0.5 |
| Adhesion-imparting agent | KBM-403 | 1.0 | 1.0 | — |
| | KBM-603 | 1.0 | — | — |
| Catalyst | Catalyst A | — | 40.7 | — |
| | (Table 3) | | | |
| | U-830 | — | — | 1.0 |

TABLE 3

| | | |
|---|---|---|
| Curable catalyst | Mixture of Stanoct/laurylamine (6/1) | 13.3 |
| Plasticizer | DINP | 20.0 |
| Filler | WHITON SB | 50.0 |
| | Glomax LL | 16.7 |

TABLE 4

| | | | | Case 1 | Case 2 | Case 3 | Case 4 | Case 5 | Case 6 |
|---|---|---|---|---|---|---|---|---|---|
| Curable composition | Polymer A | Polymer A1 | | 100 | — | — | — | — | — |
| | | Polymer A2 | | — | — | — | — | — | 100 |
| | | Polymer A3 | | — | 50 | 100 | — | — | — |
| | | Polymer A4 | | — | — | — | — | — | — |
| | | Polymer A5 | | — | — | — | — | — | — |
| | | Polymer A6 | | — | — | — | — | — | — |
| | | Polymer A7 | | — | — | — | — | — | — |
| | | Polymer A8 | | — | — | — | — | — | — |
| | | Polymer A9 | | — | — | — | — | — | — |
| | Comparative polymer a | Polymer a1 | | — | — | — | — | — | — |
| | Polymer B | Polymer B1 | | — | 50 | — | 50 | — | — |
| | | Polymer B2 | | — | — | — | — | — | — |
| | | Polymer B3 | | — | — | — | — | — | — |
| | | Polymer B4 | | — | — | — | — | — | — |
| | Polymer C | Polymer C1 | | — | 65 | 65 | 65 | 65 | — |
| | | Polymer C2 | | — | — | — | — | — | — |
| | Polymer H | Polymer E1 | | — | — | — | 50 | 100 | — |
| | | Polymer E2 | | — | — | — | — | — | — |
| | Polymer D | Polymer D1 | | 65 | — | — | — | — | 65 |
| | | Polymer D2 | | — | — | — | — | — | — |
| | Plasticizer | DINP | | — | — | — | — | — | — |
| | Catalyst | U-220II | | 0.5 | 0.5 | 0.5 | 0.5 | 0.5 | 0.5 |
| | | C-810 | | — | — | — | — | — | — |
| | | K-KAT 670 | | — | — | — | — | — | — |
| | Additive (Table 2) | | | Additive 1 | Additive 1 | Additive 1 | Additive 1 | Additive 1 | Additive 1 |
| | Viscosity A or (A + B) | | Pa · s/25° C. | 10 | 10 | 20 | — | — | 14 |
| | Tensile properties | M50 | $N/mm^2$ | 0.20 | 0.14 | 0.16 | 0.16 | 0.18 | 0.21 |
| | | Tmax | $N/mm^2$ | 0.66 | 0.78 | 0.70 | 0.82 | 0.76 | 0.68 |
| | | Elongation | % | 410 | 590 | 450 | 620 | 590 | 430 |
| | Elastic recovery | | % | 67 | 56 | 60 | 42 | 45 | 68 |
| | Durability against repeated expansion and contraction | | Number of times | 4,000 | 6,000 | 5,000 | 3,000 | 3,000 | 4,000 |
| | Stain resistance of coating material | | — | A | A | A | A | A | A |

| | | | Case 7 | Case 8 | Case 9 | Case 10 | Case 11 | Case 12 |
|---|---|---|---|---|---|---|---|---|
| Curable composition | Polymer A | Polymer A1 | — | — | — | — | — | — |
| | | Polymer A2 | — | — | — | — | — | — |
| | | Polymer A3 | 50 | 30 | 50 | 70 | 70 | — |
| | | Polymer A4 | — | — | — | — | — | 60 |
| | | Polymer A5 | — | — | — | — | — | — |
| | | Polymer A6 | — | — | — | — | — | — |
| | | Polymer A7 | — | — | — | — | — | — |
| | | Polymer A8 | — | — | — | — | — | — |
| | | Polymer A9 | — | — | — | — | — | — |
| | Comparative polymer a | Polymer a1 | — | — | — | — | — | — |
| | Polymer B | Polymer B1 | 50 | 70 | 50 | 30 | — | — |
| | | Polymer B2 | — | — | — | — | 30 | — |
| | | Polymer B3 | — | — | — | — | — | — |
| | | Polymer B4 | — | — | — | — | — | — |
| | Polymer C | Polymer C1 | — | 32.5 | 32.5 | 32.5 | 32.5 | 72.5 |
| | | Polymer C2 | — | — | — | — | — | — |
| | Polymer H | Polymer E1 | — | — | — | — | — | — |
| | | Polymer E2 | — | — | — | — | — | — |

TABLE 4-continued

| | | | | | | | | |
|---|---|---|---|---|---|---|---|---|
| Polymer D | | Polymer D1 | | 65 | 32.5 | 32.5 | 32.5 | 32.5 | 32.5 |
| | | Polymer D2 | | — | — | — | — | — | — |
| Plasticizer | | DINP | | — | — | — | — | — | — |
| Catalyst | | U-220II | | 0.5 | 0.5 | 0.5 | 0.5 | 0.5 | 0.5 |
| | | C-810 | | — | — | — | — | — | — |
| | | K-KAT 670 | | — | — | — | — | — | — |
| Additive (Table 2) | | | | Additive 1 | Additive 1 | Additive 1 | Additive 1 | Additive 1 | Additive 1 |
| Viscosity A or (A + B) | | | Pa · s/25° C. | 10 | 8 | 10 | 13 | 11 | 20 |
| Tensile properties | M50 | | $N/mm^2$ | 0.18 | 0.18 | 0.16 | 0.16 | 0.17 | 0.17 |
| | Tmax | | $N/mm^2$ | 0.57 | 0.62 | 0.72 | 0.74 | 0.69 | 0.67 |
| | Elongation | | % | 400 | 460 | 550 | 570 | 490 | 510 |
| Elastic recovery | | | % | 62 | 57 | 60 | 64 | 59 | 64 |
| Durability against repeated expansion and contraction | | | Number of times | 4,000 | 5,000 | 6,000 | 5,000 | 5,000 | 5,000 |
| Stain resistance of coating material | | | — | A | A | A | A | A | A |

TABLE 5

| | | | | Case 13 | Case 14 | Case 15 | Case 16 | Case 17 | Case 18 | Case 19 |
|---|---|---|---|---|---|---|---|---|---|---|
| Curable composition | Polymer A | Polymer A1 | | — | — | — | — | — | — | — |
| | | Polymer A2 | | — | — | — | — | — | — | — |
| | | Polymer A3 | | — | — | — | — | — | 50 | 50 |
| | | Polymer A4 | | — | — | — | — | — | — | — |
| | | Polymer A5 | | 50 | — | — | — | — | — | — |
| | | Polymer A6 | | — | 50 | — | — | — | — | — |
| | | Polymer A7 | | — | — | 100 | — | — | — | — |
| | | Polymer A8 | | — | — | — | 40 | — | — | — |
| | | Polymer A9 | | — | — | — | — | 40 | — | — |
| | Comparative polymer a | Polymer a1 | | — | — | — | — | — | — | — |
| | Polymer B | Polymer B1 | | 50 | 50 | — | — | — | — | — |
| | | Polymer B2 | | — | — | — | — | — | — | — |
| | | Polymer B3 | | — | — | — | — | — | 50 | — |
| | | Polymer B4 | | — | — | — | — | — | — | 50 |
| | Polymer C | Polymer C1 | | 32.5 | 32.5 | — | 60 | 60 | 32.5 | 32.5 |
| | | Polymer C2 | | — | — | — | — | — | — | — |
| | Polymer E | Polymer E1 | | — | — | — | — | — | — | — |
| | | Polymer E2 | | — | — | — | — | — | — | — |
| | Polymer D | Polymer D1 | | 32.5 | 32.5 | 65 | 65 | 65 | 32.5 | 32.5 |
| | | Polymer D2 | | — | — | — | — | — | — | — |
| | Plasticizer | DINP | | — | — | — | — | — | — | — |
| | Catalyst | U-220H | | 0.5 | 0.5 | 0.5 | 0.5 | 0.5 | 0.5 | 0.5 |
| | | TJ-810 | | — | — | — | — | — | — | — |
| | | K-KAT 670 | | — | — | — | — | — | — | — |
| | Additive (Table 2) | | | Additive 1 | Additive 1 | Additive 1 | Additive 1 | Additive 1 | Additive 1 | Additive 1 |
| | Viscosity A or (A + B) | | Pa · s/25° C. | 10 | 10 | 14 | 14 | 14 | 12 | 8 |
| | Tensile properties | M50 | $N/mm^2$ | 0.18 | 0.24 | 0.22 | 0.21 | 0.24 | 0.20 | 0.22 |
| | | Tmax | $N/mm^2$ | 0.69 | 0.57 | 0.65 | 0.68 | 0.56 | 0.70 | 0.61 |
| | | Elongation | % | 470 | 370 | 410 | 420 | 370 | 440 | 400 |
| | Elastic recovery | | % | 59 | 63 | 69 | 69 | 62 | 60 | 66 |
| | Durability against repeated expansion and contraction | | Number of times | 5,000 | 3,500 | 4,000 | 4,000 | 3,500 | 4,000 | 4,000 |
| | Stain resistance of coating material | | — | A | A | A | A | A | A | A |
| | | | | Case 20 | Case 21 | Case 22 | Case 23 | Case 24 | Case 25 | Case 26 |
| Curable composition | Polymer A | Polymer A1 | | — | — | — | — | — | — | — |
| | | Polymer A2 | | — | — | — | — | — | — | — |
| | | Polymer A3 | | 50 | 50 | 50 | — | — | — | — |
| | | Polymer A4 | | — | — | — | — | — | — | — |
| | | Polymer A5 | | — | — | — | — | — | — | — |
| | | Polymer A6 | | — | — | — | — | — | — | — |
| | | Polymer A7 | | — | — | — | — | — | — | — |
| | | Polymer A8 | | — | — | — | — | — | — | — |
| | | Polymer A9 | | — | — | — | — | — | — | — |
| | Comparative polymer a | Polymer a1 | | — | — | — | 100 | — | — | — |
| | Polymer B | Polymer B1 | | 50 | 50 | 50 | — | — | — | — |
| | | Polymer B2 | | — | — | — | — | — | — | — |
| | | Polymer B3 | | — | — | — | — | — | — | — |
| | | Polymer B4 | | — | — | — | — | — | — | — |
| | Polymer C | Polymer C1 | | — | 32.5 | 32.5 | — | — | — | — |

TABLE 5-continued

| | | | | | | | | | |
|---|---|---|---|---|---|---|---|---|---|
| | Polymer C2 | | 32.5 | — | — | — | — | — | — |
| Polymer E | Polymer E1 | | — | — | — | — | 100 | — | — |
| | Polymer E2 | | — | — | — | — | — | 100 | 100 |
| Polymer D | Polymer D1 | | 32.5 | 32.5 | 32.5 | 65 | 65 | — | — |
| | Polymer D2 | | — | — | — | — | — | 65 | — |
| Plasticizer | DINP | | — | — | — | — | — | — | 65 |
| Catalyst | U-220H | | 0.5 | — | — | 0.5 | 0.5 | 0.5 | 0.5 |
| | TJ-810 | | — | 2.5 | — | — | — | — | — |
| | K-KAT 670 | | — | — | 2.5 | — | — | — | — |
| Additive (Table 2) | | | Additive 1 | Additive 1 | Additive 1 | Additive 1 | Additive 1 | Additive 1 | Additive 1 |
| Viscosity A or (A + B) | | Pa · s/ 25° C. | 10 | 10 | 10 | 6 | — | — | — |
| Tensile properties | M50 | $N/mm^2$ | 0.15 | 0.15 | 0.14 | 0.22 | 0.21 | 0.20 | 0.19 |
| | Tmax | $N/mm^2$ | 0.75 | 0.56 | 0.44 | 0.60 | 0.65 | 0.72 | 0.70 |
| | Elongation | % | 570 | 540 | 500 | 350 | 500 | 550 | 510 |
| Elastic recovery | | % | 58 | 57 | 80 | 70 | 46 | 48 | 49 |
| Durability against repeated expansion and contraction | | Number of times | 6,000 | 5,000 | 5,000 | 3,000 | 3,000 | 3,000 | 3,000 |
| Stain resistance of coating material | | — | A | A | A | A | A | B | B |

As shown in Tables 4 to 5, in Cases 1 to 3 and 6 to 22, the tensile properties were favorable, the elastic recovery rate and the durability against repeated expansion and contraction were high, and the stain resistance of the coating material were favorable.

In Cases 4, 5 and 24, which did not contain the polymer A and contained the polymer E1 having three terminal groups in one molecule, the elastic recovery rate and the durability against repeated expansion and contraction were inferior.

In Cases 25 and 26, which did not contain the polymer A and contained the polymer E2 having four terminal groups in one molecule, the elastic recovery rate, the durability against repeated expansion and contraction, and the stain resistance of the coating material were inferior.

In Case 23, which did not contain the polymer A and contained the polymer a1 having six terminal groups in one molecule and having a number average molecular weight of 20,000, elongation was poor and sufficient durability against repeated expansion and contraction was not obtained.

Reference Examples 1 to 3

A curable composition was prepared by adding a polymer having the composition shown in Table 6 and an additive. The unit of the blending amount of each component shown in Table 6 is "parts by mass". Using the obtained curable composition, measurement of tack-free time and a deep-part curability test were carried out by the methods described below. The results are shown in Table 6.

Tack-Free Time Measurement

It was evaluated in accordance with the method described in JIS A 1439 (2016) "Skin-over time test". A shorter time means a faster curing rate.

Deep-Part Curability Test

A cylindrical polyethylene tube with an inner diameter of 24 mm and a height of 55 mm was allowed to stand so that one opening was brought into contact with an aluminum plate. In an atmosphere of a temperature of 23° C. and a relative humidity of 50%, the curable compositions obtained in Reference Examples 1 to 3 were filled into the inside of the tube from the other opening so as not to introduce bubbles. The curable composition protruding from the other opening described above of the tube filled with the curable composition was scraped off with a spatula to flatten the surface of the curable composition at the end portion of the tube, thereby obtaining a test specimen. The obtained test specimen was allowed to stand in the above atmosphere, and the degree of curing inward from the surface of the curable composition was examined after 1 day, 3 days and 7 days. More specifically, a surface layer where the curable composition was cured (cured portion) was collected with a spatula, the uncured curable composition attached to the collected cured portion was removed, and the thickness (unit: mm) of the obtained cured portion (height direction of the tube) was measured using a vernier caliper. The collected cured portion often had a cylindrical shape, and the thickest portion of the cured portion was measured in the measurement. The larger the thickness of the cured portion, the superior the deep-part curability.

TABLE 6

| | | | Ref. Ex. 1 | Ref. Ex. 2 | Ref. Ex. 3 |
|---|---|---|---|---|---|
| Polymer | Polymer A10 | | 100 | — | — |
| | Polymer B5 | | — | 100 | — |
| | Polymer E3 | | — | — | 100 |
| Additive (Table 2) | | | Additive 3 | Additive 3 | Additive 3 |
| Tack-free time | | Minutes | 30 | 125 | 65 |
| Deep-part curability | After 1 day | mm | 18 | 9 | 11 |
| | After 3 days | mm | 22 | 16 | 18 |
| | After 7 days | mm | 24 | 19 | 20 |

As shown in Table 6, compared to those in Reference Examples 2 and 3, the tack-free time was short and the deep-part curability was excellent in Reference Example 1.

INDUSTRIAL APPLICABILITY

According to the present invention, it is possible to provide a curable composition from which a cured product having excellent durability against repeated expansion and contraction can be obtained.

The invention claimed is:

1. A curable composition comprising:

an oxyalkylene polymer A having a reactive silicon group represented by formula (1) and having 6 or more terminal groups; and an oxyalkylene polymer B having a reactive silicon group represented by the formula (1) and having two or three terminal groups, wherein the terminal groups of oxyalkylene polymer A and oxyalkylene polymer B contain at least one selected from the group consisting of a reactive silicon group represented by the formula (1), an active hydrogen-containing group, and an unsaturated group, the oxyalkylene polymer A comprises 0.3 or more of the reactive silicon group per terminal group, a number average molecular weight of the oxyalkylene polymer A is more than 25,000 and not more than 100,000, the oxyalkylene polymer B has 0.3 to 2.0 of the reactive silicon groups per terminal group, and a number average molecular weight of the oxyalkylene polymer B is from 5,000 to 20,000:

$$—SiR_a(X)_{3-a} \quad (1)$$

wherein,

R is a monovalent organic group having 1 to 20 carbon atoms and represents an organic group other than a hydrolyzable group, and X represents a hydroxyl group, a halogen atom, or a hydrolyzable group, a is an integer of 0 to 2, wherein when a is 2, R groups may be the same as or different from each other, and when a is 0 or 1, X groups may be the same as or different from each other, and a ratio of the total of reactive silicon groups in the oxyalkylene polymer A and the oxyalkylene polymer B in which a is 0 in the formula (1) with respect to a total of the reactive silicon groups, the active hydrogen-containing groups and the unsaturated groups present in the oxyalkylene polymer A and the oxyalkylene polymer B is less than 50 mol %.

2. The curable composition according to claim 1, wherein a ratio of the oxyalkylene polymer A with respect to a total mass of the oxyalkylene polymer A and the oxyalkylene polymer B is from 20 to 95% by mass.

3. The curable composition according to claim 1, further comprising:

an oxyalkylene polymer C having a reactive silicon group represented by the formula (1) and having two terminal groups, wherein one of the terminal groups is an inert monovalent organic group, and the other terminal group contains at least one selected from the group consisting of a reactive silicon group represented by the formula (1), an active hydrogen-containing group, and an unsaturated group, the oxyalkylene polymer C has 0.2 to 1.0 of the reactive silicon groups per terminal group, and a number average molecular weight of the oxyalkylene polymer C is from 2,000 to 15,000.

4. The curable composition according to claim 1, further comprising:

an oxyalkylene polymer D having no reactive silicon group represented by the formula (1) and having a number average molecular weight of 5,000 to 20,000.

5. A sealant or an adhesive comprising the curable composition according to claim 1.

6. A cured product obtained by curing the curable composition according to claim 1.

* * * * *